(12) United States Patent
Wong et al.

(10) Patent No.: US 8,594,923 B2
(45) Date of Patent: Nov. 26, 2013

(54) METHOD AND APPARATUS FOR SHARING MAP DATA ASSOCIATED WITH AUTOMATED INDUSTRIAL VEHICLES

(75) Inventors: Lisa Wong, Auckland (NZ); Andrew Evan Graham, Waitakere (NZ); Christopher W. Goode, Auckland (NZ)

(73) Assignee: Crown Equipment Limited, Auckland (NZ)

( * ) Notice: Subject to any disclaimer, the term of this patent is extended or adjusted under 35 U.S.C. 154(b) by 195 days.

(21) Appl. No.: 13/159,500

(22) Filed: Jun. 14, 2011

(65) Prior Publication Data

US 2012/0323431 A1    Dec. 20, 2012

(51) Int. Cl.
*G01C 21/34* (2006.01)

(52) U.S. Cl.
USPC .......................................... 701/409

(58) Field of Classification Search
USPC ............. 701/25, 26, 400, 409, 410–412, 426, 701/469, 518
See application file for complete search history.

(56) References Cited

U.S. PATENT DOCUMENTS

| | | | |
|---|---|---|---|
| 4,855,915 A | 8/1989 | Dallaire | |
| 4,858,132 A | 8/1989 | Holmquist | |
| 5,011,358 A | 4/1991 | Andersen et al. | |
| 5,051,906 A | 9/1991 | Evans, Jr. et al. | |
| 5,170,352 A | 12/1992 | McTamaney et al. | |
| 5,202,832 A | 4/1993 | Lisy | |
| 5,471,393 A | 11/1995 | Bolger | |
| 5,491,670 A | 2/1996 | Weber | |
| 5,539,638 A | 7/1996 | Keeler et al. | |
| 5,568,030 A | 10/1996 | Nishikawa et al. | |
| 5,612,883 A | 3/1997 | Shaffer et al. | |
| 5,646,845 A | 7/1997 | Gudat et al. | |
| 5,682,317 A | 10/1997 | Keeler et al. | |
| 5,916,285 A | 6/1999 | Alofs et al. | |
| 5,938,710 A | 8/1999 | Lanza et al. | |
| 5,961,571 A | 10/1999 | Gorr et al. | |
| 6,012,003 A | 1/2000 | Astrom | |
| 6,092,010 A | 7/2000 | Alofs et al. | |
| 6,208,916 B1 | 3/2001 | Hori | |
| 6,246,930 B1 | 6/2001 | Hori | |

(Continued)

FOREIGN PATENT DOCUMENTS

| | | |
|---|---|---|
| DE | 19757333 C1 | 9/1999 |
| DE | 10220936 A1 | 12/2003 |

(Continued)

OTHER PUBLICATIONS

International Search Report and Written Opinion mailed Oct. 9, 2012 for PCT/NZ2012/000092.

(Continued)

*Primary Examiner* — Mary Cheung
(74) *Attorney, Agent, or Firm* — Dinsmore & Shohl LLP (57) ABSTRACT

A method and apparatus for sharing map data between industrial vehicles in a physical environment is described. In one embodiments, the method includes processing local map data associated with a plurality of industrial vehicles, wherein the local map data comprises feature information generated by the plurality of industrial vehicles regarding features observed by industrial vehicles in the plurality of vehicles; combining the feature information associated with local map data to generate global map data for the physical environment; and navigating an industrial vehicle of the plurality of industrial vehicles using at least a portion of the global map data.

28 Claims, 7 Drawing Sheets

(56) References Cited

U.S. PATENT DOCUMENTS

| | | | |
|---|---|---|---|
| 6,295,503 B1 * | 9/2001 | Inoue et al. | 701/410 |
| 6,308,118 B1 | 10/2001 | Holmquist | |
| 6,539,294 B1 | 3/2003 | Kageyama | |
| 6,592,488 B2 | 7/2003 | Gassmann | |
| 6,917,839 B2 | 7/2005 | Bickford | |
| 6,952,488 B2 | 10/2005 | Kelly et al. | |
| 7,148,458 B2 | 12/2006 | Schell et al. | |
| 7,162,338 B2 | 1/2007 | Goncalves et al. | |
| 7,177,737 B2 | 2/2007 | Karlsson et al. | |
| 7,246,007 B2 * | 7/2007 | Ferman | 701/409 |
| 7,272,467 B2 | 9/2007 | Goncalves et al. | |
| 7,499,796 B2 * | 3/2009 | Listle et al. | 701/426 |
| 7,539,563 B2 | 5/2009 | Yang et al. | |
| 7,646,336 B2 | 1/2010 | Tan et al. | |
| 7,679,532 B2 | 3/2010 | Karlsson et al. | |
| 7,688,225 B1 | 3/2010 | Haynes et al. | |
| 7,689,321 B2 | 3/2010 | Karlsson | |
| 7,720,554 B2 | 5/2010 | DiBernardo et al. | |
| 7,734,385 B2 | 6/2010 | Yang et al. | |
| 7,844,364 B2 | 11/2010 | McLurkin et al. | |
| 7,996,097 B2 | 8/2011 | DiBernardo et al. | |
| 8,020,657 B2 | 9/2011 | Allard et al. | |
| 8,050,863 B2 | 11/2011 | Trepangnier et al. | |
| 8,103,383 B2 | 1/2012 | Nakamura | |
| 8,126,642 B2 | 2/2012 | Trepagnier et al. | |
| 8,150,650 B2 | 4/2012 | Goncalves et al. | |
| 8,204,679 B2 | 6/2012 | Nakamura | |
| 8,255,107 B2 | 8/2012 | Yang et al. | |
| 8,280,623 B2 | 10/2012 | Trepagnier et al. | |
| 2004/0030493 A1 | 2/2004 | Pechatnikov et al. | |
| 2004/0202351 A1 | 10/2004 | Park et al. | |
| 2004/0249504 A1 | 12/2004 | Gutmann et al. | |
| 2005/0075116 A1 | 4/2005 | Laird et al. | |
| 2005/0149256 A1 | 7/2005 | Lawitzky et al. | |
| 2005/0182518 A1 | 8/2005 | Karlsson | |
| 2006/0181391 A1 | 8/2006 | McNeill et al. | |
| 2006/0184013 A1 | 8/2006 | Emanuel et al. | |
| 2007/0061043 A1 * | 3/2007 | Ermakov et al. | 700/263 |
| 2007/0090973 A1 | 4/2007 | Karlsson et al. | |
| 2007/0106465 A1 | 5/2007 | Adam et al. | |
| 2007/0150097 A1 | 6/2007 | Chae et al. | |
| 2007/0153802 A1 | 7/2007 | Anke et al. | |
| 2007/0262884 A1 | 11/2007 | Goncalves et al. | |
| 2008/0015772 A1 * | 1/2008 | Sanma et al. | 701/207 |
| 2009/0012667 A1 | 1/2009 | Matsumoto et al. | |
| 2009/0140887 A1 | 6/2009 | Breed et al. | |
| 2009/0216438 A1 * | 8/2009 | Shafer | 701/210 |
| 2010/0023257 A1 * | 1/2010 | Machino | 701/201 |
| 2010/0161224 A1 | 6/2010 | Lee et al. | |
| 2010/0222925 A1 | 9/2010 | Anezaki | |
| 2010/0256908 A1 | 10/2010 | Shimshoni et al. | |
| 2010/0268697 A1 | 10/2010 | Karlsson et al. | |
| 2010/0286905 A1 | 11/2010 | Goncalves et al. | |
| 2011/0010023 A1 | 1/2011 | Kunzig et al. | |
| 2011/0121068 A1 | 5/2011 | Emanuel et al. | |
| 2011/0125323 A1 | 5/2011 | Gutmann et al. | |
| 2011/0150348 A1 | 6/2011 | Anderson | |
| 2011/0153338 A1 | 6/2011 | Anderson | |
| 2011/0230207 A1 | 9/2011 | Hasegawa | |
| 2012/0035797 A1 | 2/2012 | Oobayashi et al. | |
| 2012/0101784 A1 | 4/2012 | Lindores et al. | |
| 2012/0191272 A1 * | 7/2012 | Andersen et al. | 701/2 |
| 2012/0323431 A1 | 12/2012 | Wong et al. | |
| 2013/0006420 A1 | 1/2013 | Karlsson et al. | |

FOREIGN PATENT DOCUMENTS

| | | |
|---|---|---|
| DE | 10234730 A1 | 2/2004 |
| DE | 102007021693 A1 | 11/2008 |
| EP | 1732247 A1 | 12/2006 |
| GB | 2389947 A | 12/2003 |
| JP | 60067818 A | 4/1985 |
| JP | 2992048579 A | 2/2002 |
| JP | 2002108446 A | 4/2002 |
| JP | 2005114546 A | 4/2005 |
| WO | 03096052 A2 | 11/2003 |

OTHER PUBLICATIONS

Office Action from U.S. Appl. No. 13/159,501 mailed Jan. 10, 2013.
Office Action from U.S. Appl. No. 12/660,616 mailed Nov. 27, 2012.
"Three Engineers, Hundreds of Robots, One Warehouse," Guizzo, IEEE Spectrum, Jul. 2008.
Office Action from U.S. Appl. No. 13/116,600 mailed Dec. 31, 2012.
Search Report/Written Opinion from PCT/NZ2012/000051 mailed Jan. 2, 2013.
Search Report/Written Opinion from PCT/NZ2012/000091 mailed Oct. 31, 2012.
Search Report/Written Opinion from PCT/US2012/054062 mailed Nov. 27, 2012.
Search Report/Written Opinion from PCT/US2012/052247 mailed Nov. 27, 2012.
Borenstein et al. "Mobile Robot Positioning—Sensors and Techniques", Journal of Robotic Systems, Special Issue on Mobile Robots, vol. 14, No. 4, pp. 231-249, Apr. 1997.
Harmon et al., "A Technique for Coordinating Autonomous Robots", Autonomous Systems Branch Naval Ocean Systems Center San Diego, CA 92152, 1986.
Jansfelt et al., "Laser Based Position Acquisition and Tracking in an Indoor Environment", Proc. Int. Symp. Robotics and Automation, 1998.
Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.
International Search Report and Written Opinion pertaining to International Patent Application No. PCT/NZ2012/000084, dated Jan. 30, 2013.
Office Action pertaining to U. S. Appl. No. 13/219,271, dated Feb. 25, 2013.
Office Action pertaining to U. S. Appl. No. 13/153,743, dated Mar. 4, 2013.
Office Action from U.S. Appl. No. 12/948,358 mailed Apr. 8, 2013.
Office Action mailed May 8, 2013 from U.S. Appl. No. 13/672,260, filed Nov. 8, 2012.
Office Action mailed Jun. 4, 2013 from U.S. Appl. No. 13/159,501, filed Jun. 14, 2011.
Office Action mailed May 21, 2013 from U.S. Appl. No. 12/718,620, filed Mar. 5, 2010.
Office Action mailed Jul. 12, 2013 from U.S. Appl. No. 13/227,165, filed Sep. 7, 2011.

* cited by examiner

METHOD AND APPARATUS FOR SHARING MAP DATA ASSOCIATED WITH AUTOMATED INDUSTRIAL VEHICLES

BACKGROUND

1. Technical Field

Embodiments of the present invention generally relate to an environment based navigation systems for automated industrial vehicles and, more importantly, to a method and apparatus for sharing map data associated with automated industrial vehicles.

2. Description of the Related Art

Entities regularly operate numerous facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. Warehouses and other shared use spaces, for instance, must be safe for a human work force. Some employees operate heavy machinery and industrial vehicles, such as forklifts, which have the potential to cause severe or deadly injury. Nonetheless, human beings are required to use the industrial vehicles to complete tasks, which include object handling tasks, such as moving pallets of goods to different locations within a warehouse. Most warehouses employ a large number of forklift drivers and forklifts to move objects. In order to increase productivity, these warehouses simply add more forklifts and forklift drivers.

In order to mitigate the aforementioned problems, some warehouses utilize equipment for automating these tasks. As an example, these warehouses may employ automated industrial vehicles, such as forklifts, to carry objects on paths and then, unload these objects onto designated locations. When navigating an industrial vehicle, it is necessary to account for uncertainty and noise associated with the sensor measurements. Because the sensors coupled to the industrial vehicle are limited to specific field of view or range, the industrial vehicle cannot extract and process data associated with certain features and landmarks that cannot be observed.

Therefore, there is a need in the art for a method and apparatus for sharing map data amongst automated industrial vehicles.

SUMMARY

Various embodiments of the present disclosure generally include a method and apparatus comprising processing local map data associated with a plurality of industrial vehicles, wherein the local map data comprises feature information generated by the plurality of industrial vehicles regarding features observed by industrial vehicles in the plurality of vehicles; combining the feature information associated with local map data to generate global map data for the physical environment; and navigating an industrial vehicle of the plurality of industrial vehicles using at least a portion of the global map.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
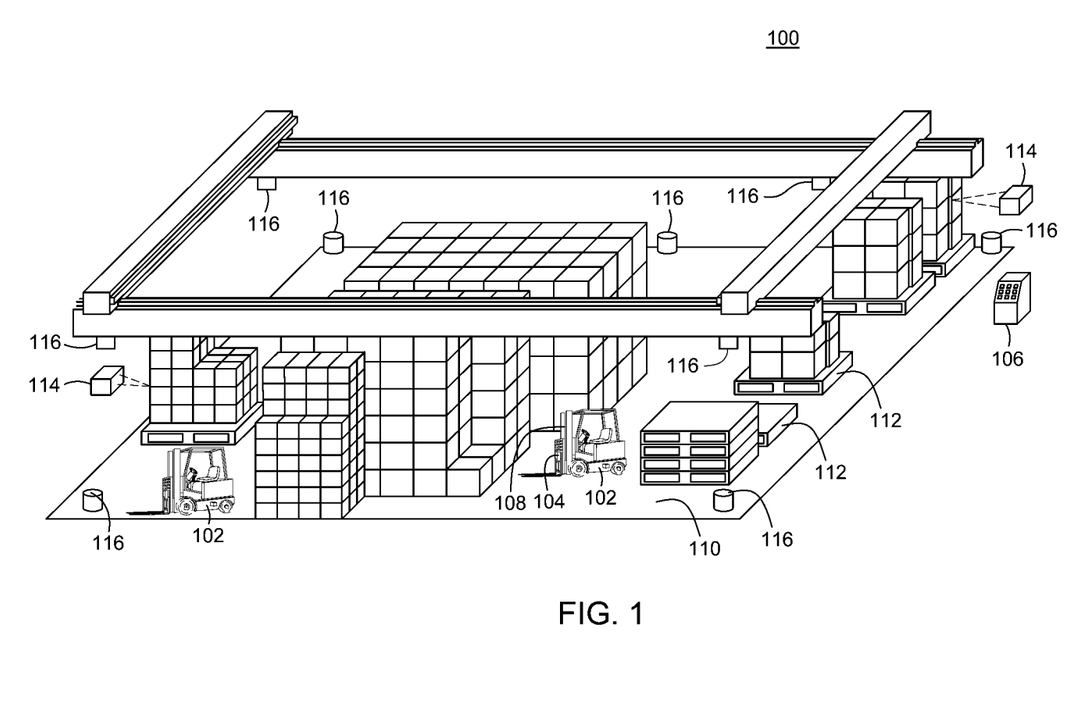
FIG. 1 is a perspective view of a physical environment comprising various embodiments of the present disclosure.

FIG. 1 illustrates a schematic, perspective view of a physical environment 100 comprising one or more embodiments of the present invention.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (e.g., image data, video data, map data, three-dimensional graph data and/or the like) to the mobile computer 104 and/or the central computer 106, as explained further below. The sensor array 108 includes various types of sensors, such as encoders, ultrasonic range finders, laser range finders, pressure transducers and/or the like.

The physical environment 100 further includes a floor 110 supporting a plurality of objects. The plurality of objects include a plurality of pallets 112, a plurality of units 114 and/or the like as explained further below. The physical environment 100 also includes various obstructions (not pictured) to the proper operation of the vehicle 102. Some of the plurality of objects may constitute obstructions along various paths (e.g., pre-programmed or dynamically computed routes) if such objects disrupt task completion. For example, an obstacle includes a broken pallet at a target destination associated with an object load being transported. The physical environment 100 also includes a plurality of markers 116. The plurality of markers 116 are illustrated as objects attached to a ceiling. In some embodiments, the markers 116 may be located on the floor or a combination of the floor and ceiling. In some embodiments, the plurality of markers 116 are beacons that facilitate environment based navigation as explained further below. The plurality of markers 116 as well as other objects around the physical environment 100 form landmarks defined by environmental features. The mobile computer 104 extracts the environment features and determines an accurate, current vehicle pose.

The physical environment 100 may include a warehouse or cold store for housing the plurality of units 114 in preparation for future transportation. Warehouses may include loading docks to load and unload the plurality of units from commercial vehicles, railways, airports and/or seaports. The plurality of units 114 generally include various goods, products and/or raw materials and/or the like. For example, the plurality of units 114 may be consumer goods that are placed on ISO standard pallets and loaded into pallet racks by forklifts to be distributed to retail stores. The vehicle 102 facilitates such a distribution by moving the consumer goods to designated locations where commercial vehicles (e.g., trucks) load and subsequently deliver the consumer goods to one or more target destinations.

According to one or more embodiments, the vehicle 102 may be an automated guided vehicle (AGV), such as an automated forklift, which is configured to handle and/or move the plurality of units 114 about the floor 110. The vehicle 102 utilizes one or more lifting elements, such as forks, to lift one or more units 114 and then, transport these units 114 along a path within a transit area 120 (e.g., corridor) to be placed at a slot area 122. Alternatively, the one or more units 114 may be arranged on a pallet 112 of which the vehicle 102 lifts and moves to the designated location.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of an object load and permits handling and storage efficiencies. Various ones of the plurality of pallets 112 may be utilized within a rack system (not pictured). Within a certain rack system, gravity rollers or tracks allow one or more units 114 on one or more pallets 112 to flow to the front. The one or more pallets 112 move forward until slowed or stopped by a retarding device, a physical stop or another pallet 112.

In some embodiments, the mobile computer 104 and the central computer 106 are computing devices that control the vehicle 102 and perform various tasks within the physical environment 100. The mobile computer 104 is adapted to couple with the vehicle 102 as illustrated. The mobile computer 104 may also receive and aggregate data (e.g., laser scanner data, image data and/or any other related sensor data) that is transmitted by the sensor array 108. Various software modules within the mobile computer 104 control operation of hardware components associated with the vehicle 102 as explained further below.

Embodiments of the invention utilize and update map information that is used by the industrial vehicle 102 to navigate through the environment 100 and perform tasks. The map information comprises a local map maintained by the mobile computer 104 and a global map that is maintained by the central computer 106. The local map defines features in the environment 100 that are either proximate a particular vehicle 102 or comprise features from an area of the environment 100 in which the vehicle is operating or is about to operate, while a global map defines the entire environment 100. As a vehicle performs tasks, the local map is updated by the mobile computer 104 and data added to the local map is also used to update the global map, such that the local map information updated by one vehicle is shared with other vehicles 102. The map use and update processes are described in detail below.

Figure 2:
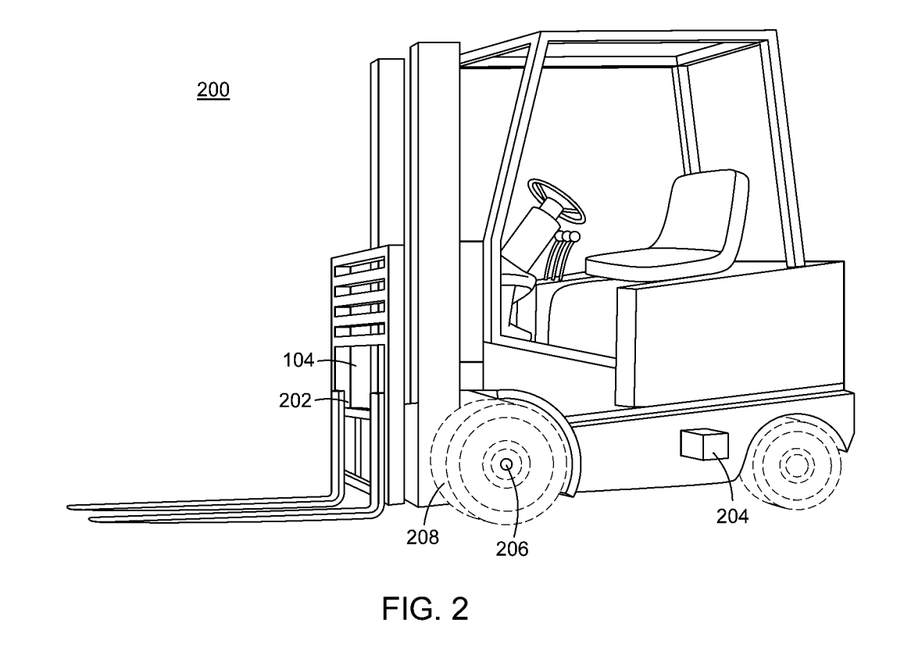
FIG. 2 illustrates a perspective view of the forklift for navigating a physical environment to perform various tasks according to one or more embodiments.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The paths may be pre-defined or dynamically computed as tasks are received. The forklift 200 may travel inside a storage bay that is multiple pallet positions deep to place or retrieve a pallet. Oftentimes, the forklift 200 is guided into the storage bay and places the pallet on cantilevered arms or rails. Hence, the dimensions of the forklift 200, including overall width and mast width, must be accurate when determining an orientation associated with an object and/or a target destination.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanical, hydraulic and/or electrically operated actuators according to one or more embodiments. In some embodiments, the forklift 200 includes one or more hydraulic actuator (not labeled) that permit lateral and/or rotational movement of two or more forks. In one embodiment, the forklift 200 includes a hydraulic actuator (not labeled) for moving the forks together and apart. In another embodiment, the forklift 200 includes a mechanical or hydraulic component for squeezing a unit (e.g., barrels, kegs, paper rolls and/or the like) to be transported.

The forklift 200 may be coupled with the mobile computer 104, which includes software modules for operating the forklift 200 in accordance with one or more tasks. The forklift 200 is also coupled with an array comprising various sensor devices (e.g., the sensor array 108 of FIG. 1), which transmits sensor data (e.g., image data, video data, planar range data and/or three-dimensional graph data) to the mobile computer 104 for extracting information associated with environmental features. These devices may be mounted to the forklift 200 at any exterior and/or interior position or mounted at known locations around the physical environment 100. Exemplary embodiments of the forklift 200 typically includes a camera 202, a planar laser scanner 204 attached to each side and/or an encoder 206 attached to each wheel 208. In other embodiments, the forklift 200 includes only the planar laser scanner 204 and the encoder 206. The forklift 200 may use any sensor array with a field of view that extends to a current direction of motion (e.g., travel forwards, backwards, fork motion up/down, reach out/in and/or the like). These encoders determine motion data related to vehicle movement. Externally mounted sensors may include laser scanners or cameras positioned where the rich data set available from such sensors would enhance automated operations. External sensors may include a limited set transponders and/or other active or passive means by which an automated vehicle could obtain an approximate position to see a localization function.

In some embodiments, a number of sensor devices (e.g., laser scanners, laser range finders, encoders, pressure transducers and/or the like) as well as their position on the forklift 200 are vehicle dependent, and the position at which these sensors are mounted affects the processing of the measurement data. For example, by ensuring that all of the laser scanners are placed at a measurable position, the sensor array 108 may process the laser scan data and transpose it to a center point for the forklift 200. Furthermore, the sensor array 108 may combine multiple laser scans into a single virtual laser scan, which may be used by various software modules to control the forklift 200.

Figure 3:
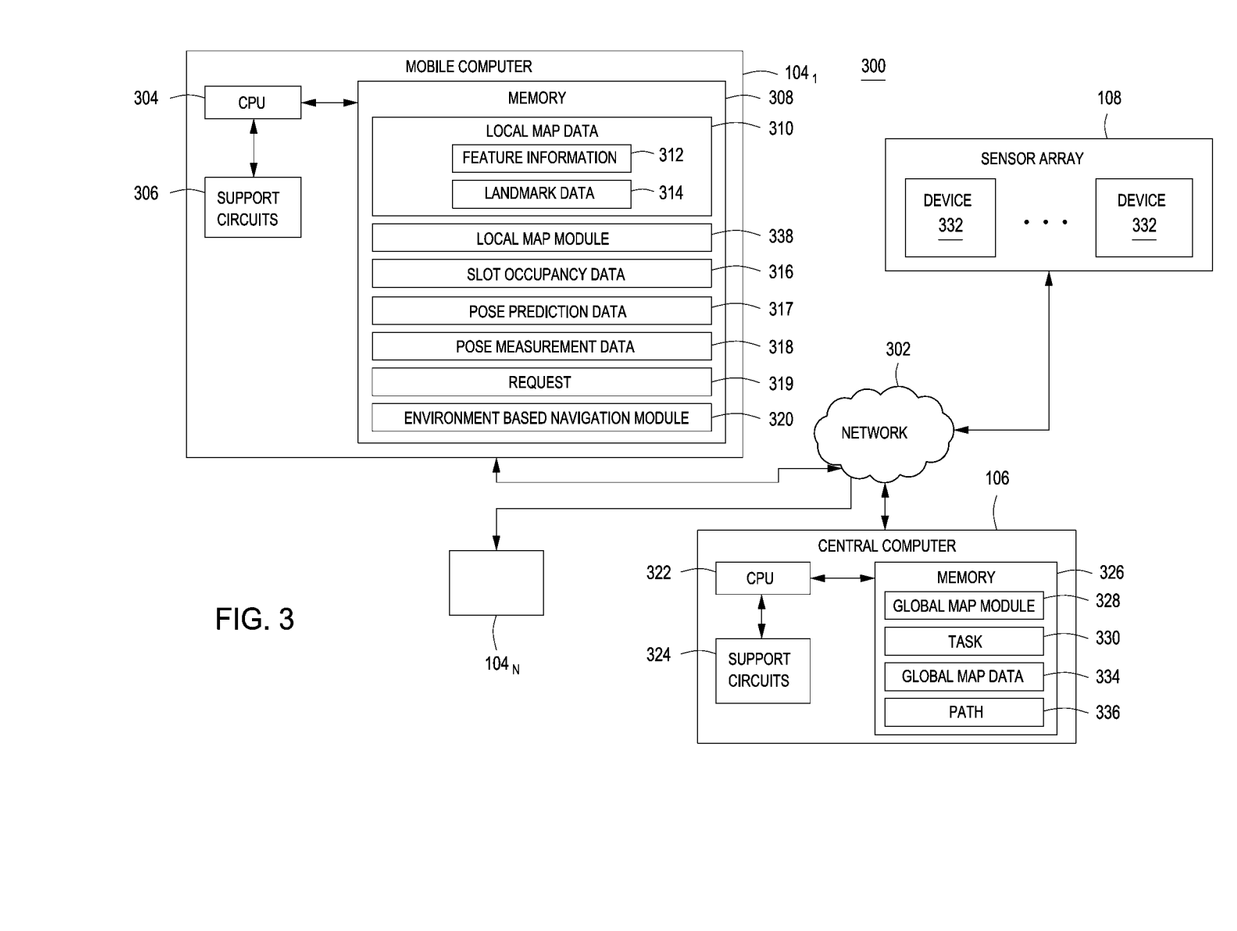
FIG. 3 is a structural block diagram of a system for providing map creation, updating and sharing for an industrial vehicle according to one or more embodiments.

FIG. 3 is a structural block diagram of a system 300 for providing accurate localization for an industrial vehicle using map data sharing amongst vehicles according to one or more embodiments. In some embodiments, the system 300 includes a plurality of mobile computers 104 (illustrated as the mobile computer $104_1$ ... the mobile computer $104_N$) associated with a plurality of automated vehicles, the central computer 106 and the sensor array 108 in which each component is coupled to each other through a network 302.

Each of the plurality of mobile computers 104 is a type of computing device (e.g., a laptop computer, a desktop computer, a Personal Desk Assistant (PDA) and the like) that comprises a central processing unit (CPU) 304, various support circuits 306 and a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits and/or the like. The memory 308 includes a read only memory, random access memory, disk drive storage, optical storage, removable storage, and the like. The memory 308 includes various data, such as local map data 310, feature information 312, landmark data 314, slot occupancy data 316, pose prediction data 317, pose measurement data 318 and a request 319. The memory 308 includes various software packages, such as an environment based navigation module 320 and a local map module 338.

The central computer 106 is a type of computing device (e.g., a laptop computer, a desktop computer, server, a Personal Desk Assistant (PDA) and the like) that comprises a central processing unit (CPU) 322, various support circuits 324 and a memory 326. The CPU 322 may comprise one or more commercially available microprocessors or microcontrollers that facilitate data processing and storage. Various support circuits 324 facilitate operation of the CPU 322 and may include clock circuits, buses, power supplies, input/output circuits and/or the like. The memory 326 includes a read only memory, random access memory, disk drive storage, optical storage, removable storage, and the like. The memory 326 includes various software packages, such as a global map module 328, as well as various data, such as a task 330, global map data 334 and a path 336.

The network 302 comprises a communication system that connects computers by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranet using various communications infrastructure such as Ethernet, WiFi, WiMax, General Packet Radio Service (GPRS), and the like.

The sensor array 108 is communicably coupled to the mobile computer 104, which is attached to an automated vehicle, such as a forklift (e.g., the forklift 200 of FIG. 2). The sensor array 108 includes a plurality of devices 332 for monitoring a physical environment and capturing various data, which is stored by the mobile computer 104 as the pose measurement data 318. In some embodiments, the sensor array 108 may include any combination of one or more laser scanners and/or one or more cameras. In some embodiments, the plurality of devices 332 may be mounted to the automated vehicle. For example, a laser scanner and a camera may be attached to a lift carriage at a position above the forks. Alternatively, the laser scanner and the camera may be located below the forks.

In some embodiments, for a given task 330, the central computer 106 computes a path 336 to be used by the vehicle 102 to complete the task 330. The use of both local map data 310 and global map data 334 facilitates accurate and autonomous guidance of the vehicle 102 through the environment to complete the task 330.

In some embodiments, the local map module 338 utilizes and maintains the local map data 310 as well as transmits updates to the global map module 326 of the central computer 106. The local map data 310 comprises feature information 312 and landmark data 314. In one embodiment, the feature information includes a dynamic and/or static features representing a physical environment proximate the vehicle, such as a shared use area for human workers and automated industrial vehicles. Static features represent objects that do not change within the environment, e.g., walls, storage racks, and the like. The local map data 310 may be organized to form a vector of known landmarks, static and dynamic features. In some embodiments feature information 312 include: feature geometry (line, corner, arc, etc.); a feature pose in global coordinate system; and a feature pose uncertainty. Static features represent objects that do not change within the environment, e.g., walls, storage racks, and the like. Typically the pose uncertainty for static features is zero.

In some embodiments, dynamic features represent objects that change within the environment, e.g. temporary obstructions such as broken pallets, objects to be stored, and the like. These features are likely to be stationary for a sufficient amount of time for the system to use them as localization map features. The system does not contain a-priori information about the pose of these features and thus the pose of these dynamic features can only be inferred by superimposing the vehicle centric measurement from sensors onto the estimated pose of the vehicle with respect to the global coordinate system. Because of the noise in sensor data, as well as the uncertainty in the vehicle pose estimation, all dynamic features have a pose uncertainty associated with their pose.

In some embodiments, the map module 338 stores local map information as landmarks 314. A landmark represents a physical entity within the environment (100 of FIG. 1) with a known or estimated pose. The landmark data 314 comprises a geometry, a pose, and a set of specific features which represent sensor views of the landmark, for example a wall may be viewed by a planar laser scanner as a line, an aisle as two parallel lines, etc. Some of the plurality of landmarks includes walls, a pallet or racking system in which a number of slots are configured for holding objects.

In some embodiments, the local map module 338 maintains slot information (as a set of slot geometries and poses, as part of the landmark data 314. Slots are a class of virtual landmark since their geometry is fixed however the presence of a pallet in the slot will indicate whether this landmark and the associated features information 312 is visible to the vehicle. The slot occupancy data 316 indicates the presence of a pallet in the associated slot and thus whether the features associated with this pallet form part of the local map data. Slots may exist on the floor where they may be used for navigation or above the floor in either a stacked arrangement or in the racking system.

In some embodiments, the environment based navigation module 320 includes software code (e.g., processor-executable instructions) for determining an accurate vehicle pose and updating the local map data 310 with new landmarks and associated portions of the landmark feature information 312 including their pose and pose uncertainty. After the environment based navigation module 320 processes the pose measurement data 318 from the plurality of sensor devices 332, the environment based navigation module 320 corrects the pose prediction data 317.

In some embodiments, the pose prediction data 317 includes an estimate of vehicle position and/or orientation of which the present disclosure may refer to as the vehicle pose prediction. The environment based navigation module 320 may produce such an estimate using a prior vehicle pose in addition to a vehicle motion model. The environment based navigation module 320 may also use a process filter to estimate uncertainty and/or noise for an upcoming vehicle pose prediction and update steps. After subsequently referencing a map of the physical environment, the environment based navigation module 320 determines an estimate of a current vehicle position. The uncertainty in a vehicle pose creates an uncertainty in the position of observed features. The pose uncertainty in the feature information 312 is derived from a combination of vehicle position uncertainty and sensor noise.

The global map module 328 includes software code (e.g., processor-executable instructions) for processing the local map data 310 from at least two industrial vehicles and generating the global map data 334. In some embodiments, the global map module 328 defines the global map data 334 as a vector of vector of known landmarks, which can be used to construct a vector of known features. These features correspond to features expected to be extracted from vehicle sensors. Some of the at least two industrial vehicles may reference different coordinate systems for the local map data 310. As such, one or more landmark positions are transformed into positions of a common coordinate system.

In some embodiments, the global map module 328 correlates the feature information 312 and landmark data 314 of the local map data associated with each of the at least two industrial vehicles by combining observed features for known landmarks and/or adding features for new landmarks to the global map data 334. The global map data 334 may be used to supplement the local map data 310 at a later date with expected features that have not yet been observed by a vehicle. Hence, the feature information 312 associated with a particular industrial vehicle may be used to provide additional features on landmarks or entirely new landmarks that have not been observed by another industrial vehicle, such as corners, walls, objects behind infrastructure and/or the like.

In one embodiment, the global map module 328 uses statistical methods to estimate the pose of a new feature observed by at least two industrial vehicles evaluating the feature pose uncertainty provided by each vehicle. In an alternative embodiment the global map module 328 may use a filter to combine pose measurements from multiple vehicles and develop a derived pose estimate.

In some embodiments, the mobile computer 104 periodically sends a request 319 to the central computer 106. In response to the request 319, the central computer 106 sends an update to the local map data 310. The update may include an update to: the slot occupancy data 316, feature information 312 derived from other vehicles, landmark data 314 and the like. Such updates ensure that the mobile computer utilizes the most recent information for navigating the vehicle. In an alternative embodiment, the central computer 106 may periodically publish the updates to the local map data 310 and push the update to the mobile computer 104.

Figure 4:
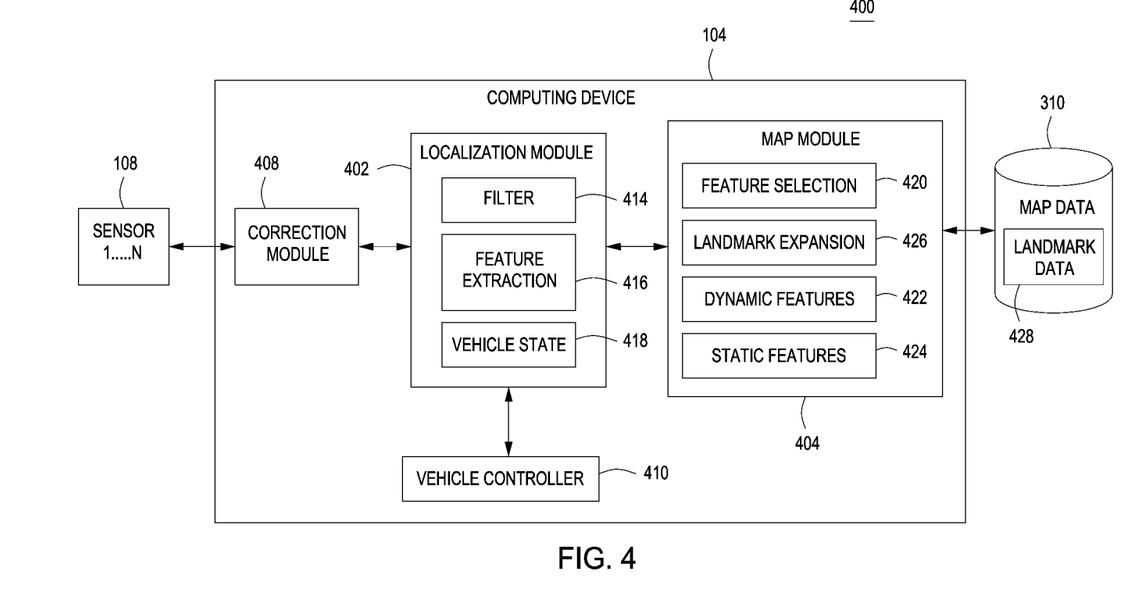
FIG. 4 is a functional block diagram of a system for providing map creation, updating and sharing for an industrial vehicle according to one or more embodiments.

FIG. 4 is a functional block diagram of a system 400 for providing accurate localization for an industrial vehicle according to one or more embodiments. The system 400 includes the mobile computer 104, which couples to an industrial vehicle, such as a forklift, as well as the sensor array 108. Various software modules within the mobile computer 104 collectively form an environment based navigation module (e.g., the environment based navigation module 320 of FIG. 3).

The mobile computer 104 includes various software modules (i.e., components) for performing navigational functions of the environment based navigation module 320 of FIG. 3, such as a localization module 402, a correction module 408, and a vehicle controller 410. In addition, mobile computer 104 executes the local map module 338. The mobile computer 104 provides accurate localization for the industrial vehicle and updates local map data 310 with information associated with environmental features. The localization module 402 also includes various components, such as a filter 414 and a feature extraction module 416, for determining a vehicle state 418. The map module 404 includes various data, such as dynamic features 422 and static features. The map module 404 also includes various components, such as a feature selection module 420 and the landmark expansion module 426.

In some embodiments, the sensor data is corrected in correction module 408 to correct for temporal and/or spatial distortion. The localization module 402 processes the corrected data and extracts features from the sensor data using feature extraction component 416. These features are matched with the features from local map module 338, with the feature pose uncertainty and observation noise taken into account, and vehicle state 418 is then adjusted by the filter 414. Features extracted will also be used to update any dynamic features 422 and/or used to add additional dynamic features. These features will be processed by map module 338 along with the vehicle pose uncertainty at the time of observation, as well as the observation uncertainty caused by noise in sensor reading. The map module will be using the features and their observed pose uncertainty to update map data 310. The vehicle state 418 which is modeled by the filter 414, refers to a current vehicle state, and includes pose information (e.g., coordinates) that indicate vehicle position and orientation. The localization module 402 communicates data associated with the vehicle state 418 to the mapping module 404 while also communicating such data to the vehicle controller 410. Based on the vehicle position and orientation, the vehicle controller 410 navigates the industrial vehicle to a destination.

In addition to the filter 414 for calculating the vehicle state 418, the localization module 414 also includes the feature extraction module 416 for extracting standard features from the corrected sensor data. The map module 338 uses feature selection 420 together with the vehicle state 418 to select from the available the dynamic features 422 and static features 424 available to the localization module 402 by eliminating invisible features from the feature set 422 and 424 thus reducing the number of features that must be examined by feature extraction 416. This can be performed by partitioning the map data into smaller area, where the partition only contains landmarks likely to be observed by the vehicle given the approximate pose of the vehicle. The feature selection module 420 also manages addition and modification of the dynamic features 422 to the map data 310. The localization module 402 and/or map module 338 can update the map data 310 to indicate areas recently occupied or cleared of certain features, such as known placed and picked items.

In some embodiments the map module 338 includes a landmark expansion module 426 which processes that landmark data 428 forming part of the local map 406 to create the static features 422 and dynamic features 424 that are associated with this landmark. Landmark expansion will associate a feature uncertainty with the created features according to the landmark uncertainty.

It is appreciated that the system 400 may employ several computing devices to perform environment based navigation. Any of the software modules within the computing device 104 may be deployed on different or multiple physical hardware components, such as other computing devices. The local map module 338, for instance, may be executed on a server computer (e.g., the central computer 106 of FIG. 1) over a network (e.g., the network 302 of FIG. 3) to connect with multiple mobile computing devices for the purpose of sharing and updating the map data 310 with a current vehicle position and orientation.

In some embodiments, the local map module 338 processes observed features from the industrial vehicle and generates (or enhances) the local map data 310 (i.e., maintains local map data). Essentially, the map module 338 at the mobile computer 104 updates the dynamic features 422 as well as the map data 310 with features and landmarks that were observed by the industrial vehicle upon which the mobile computer 104 is associated. The observed features (and/or landmarks) are transmitted to the central computer 106 for inclusion in the global map data. As such, the local map data of other vehicles will be updated with information from the global map data. Consequently, the disparate vehicles share their observed features and/or landmarks. The vehicle controller 410, therefore, can now navigate the industrial vehicle associated with the mobile computer 104 using features and/or landmarks that are observed by another vehicle without first observing the landmarks.

Figure 5:
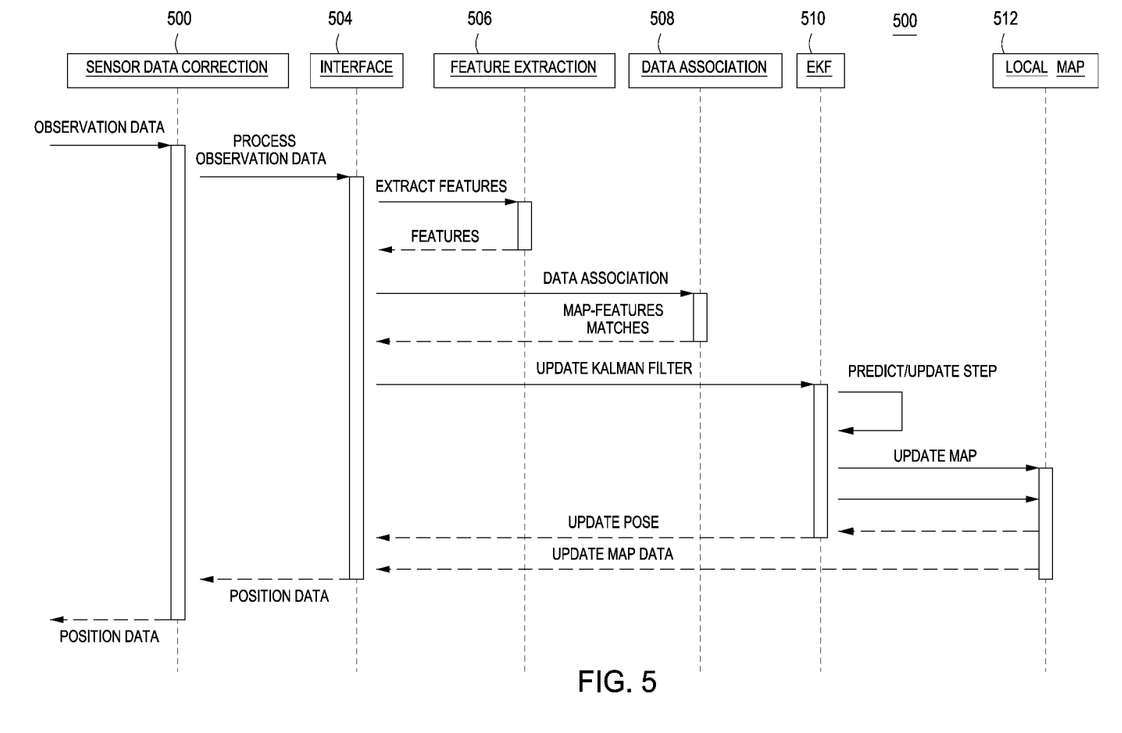
FIG. 5 is an interaction diagram illustrating a localization and mapping process for an industrial vehicle according to one or more embodiments.

FIG. 5 is an EBN structure diagram illustrating a elements and interfaces for a localization and mapping system 500 for an industrial vehicle according to one or more embodiments. Specifically, the localization and mapping process 500 includes processing and communicating various data between components or layers, such as sensor data correction 502, an interface 504, feature extraction 507, data association 508, EKF 510 and dynamic map 512. The localization and mapping process 500 supports industrial vehicle operation using primarily environmental features. The interface 504 facilitates control over the layers and is added to an environment based navigation module.

The feature extraction 506 examines data inputted by sensor devices and extracts observed features (e.g. lines and corners). The data association 508 compares the observed features with known feature information to identify matching features with existing static and/or dynamic map data 424, 422. The EKF 710 is an Extended Kalman Filter that, given measurements associated with the matching features and a previous vehicle pose, provides a most likely current vehicle pose. The map manager 512 maintains an up-to-date dynamic map of features used for localization that are not found in a-priori static map. These updates to the dynamic map data are sent to the central computer for inclusion in the global map data.

The sensor data correction 502 is a step in the localization process 514 where motion artifacts are removed from the sensor data prior to a vehicle pose prediction according to some embodiments. The sensor data correction 502 uses the vehicle motion data, which is acquired from various sensor data and then modifies sensor data that may be affected by the vehicle motion prior to this data being communicated to the interface 504. For example, the sensor data correction 502 uses a wheel diameter and encoder data to compute velocity measurements. A change in vehicle pose causes the motion artifacts in subsequent laser scanner data. Accordingly, the sensor data correction 502 modifies the laser scanner data prior to invoking the EKF 510 via the interface 504. The EKF 510, in response, performs a pose prediction in order to estimate current position data based on the vehicle motion data. The EKF 510 corrects the estimated current position data in response to the laser scanner data. Via the interface 504, the corrected current position data is communicated back to the vehicle.

Figure 6:
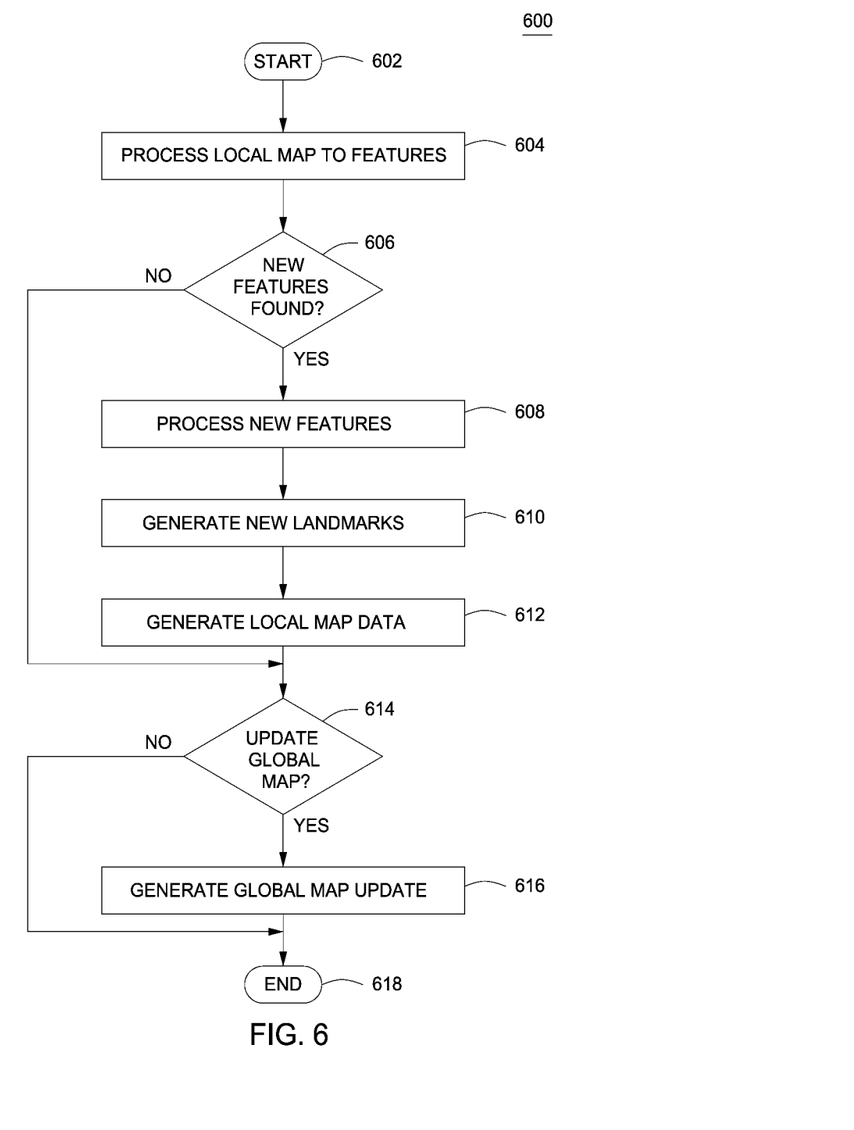
FIG. 6 is a flow diagram of a method of operation of a local map module associated with industrial vehicles according to one or more embodiments.

FIG. 6 is a flow diagram of a method 600 of operation for the local map module according to one or more embodiments. In some embodiments, a map module (e.g., the local map module 338 of FIG. 3) performs each and every step of the method 600. The map module may be component of an environment based navigation module (e.g., the environment based navigation module 320 of FIG. 3). In other embodiments, some steps are omitted or skipped. The method 600 starts at step 602 and proceeds to step 604. At step 604, the method 600 processes map data (e.g., the local map data 310 of FIG. 3) associated with one or more industrial vehicles. The map data provides locations and/or dimensions for one or more landmarks within a physical environment. In some embodiments, the method 600 stores the map data in a mobile computer (e.g., the mobile computer 104 of FIGS. 1 and 4) coupled to a particular industrial vehicle as local map data (e.g., the map data 310 of FIG. 4). In other embodiments, the method 600 stores the map data in a central computer (e.g., the central computer 106 of FIGS. 1 and 4) as global map data (e.g., the global map data 334 of FIG. 3). The local map data may initially comprise map data extracted from the global map data by the central computer and sent to the mobile computer. The extraction of the local map data is based upon the current position of the vehicle with in the environment. The central computer may send updates to the local map data to periodically provide a local map that contains the knowledge gleaned from other vehicles. A step processes the local map data, to deliver to the localization module a set of features which are currently visible from the currently estimate vehicle position. The step expands the landmarks (e.g. the landmarks 428 of FIG. 4) to create a set of features (e.g. the static features 420 and dynamic features 424 of FIG. 4) and applies geometry to the local feature set which represents the area visible to the vehicle sensors from the currently estimated position. The localization module will provide a set of observed features with their geometry, pose and pose uncertainty At step 606 the method 600 evaluates the observed features to identify if either new features information or in some embodiments whether new observations of features with a sundown time has been received. If there are now new features to method proceeds to step 614

At step 608, the method 600 processes new features to against landmark information (e.g., the landmark information 328 of FIG. 3) associated with the one or more industrial vehicles. These features may be processed using polygon matching or other pattern matching techniques. The patterns to be matched are selected from the geometries of known entities in the environment, such as pallets, loads, etc. Some observations that cannot be matches are ignored At step 610, the method 600 creates landmarks or updated existing landmarks for features which are matched. Multiple features may be combined to define a landmark. The landmarks represent physical attributes of the environment that can be used for navigation. The method 600 adds the new landmarks to the map data as landmark data 314 of FIG. 3.

At step 612, the method 600 generates local map data for the physical environment (i.e., a shared used space). The local map data includes the feature information associated with the disparate features that form the certain landmark. In other words, the local map data includes features that are observed by the industrial vehicle. This landmark data (comprising the features) is transmitted to the central computer for inclusion into the global map data.

At step 614 the method 600 decides whether to update the global map with new landmark information. Updates may be generated whenever a new landmark is identified, or may be updated periodically. In addition the method may generate a request to update the local may to add new features observed by other industrial vehicles.

At step 616 the method 600 packages the new landmark information in a form suitable to update the global map. Each new landmark includes a pose and an uncertainty. The uncertainty is dependent on the uncertainty of the feature observations and the number of features that match the landmark geometry. Thus the uncertainty includes a position uncertainty and an identification uncertainty At step 618, the method 600 ends.

Figure 7:
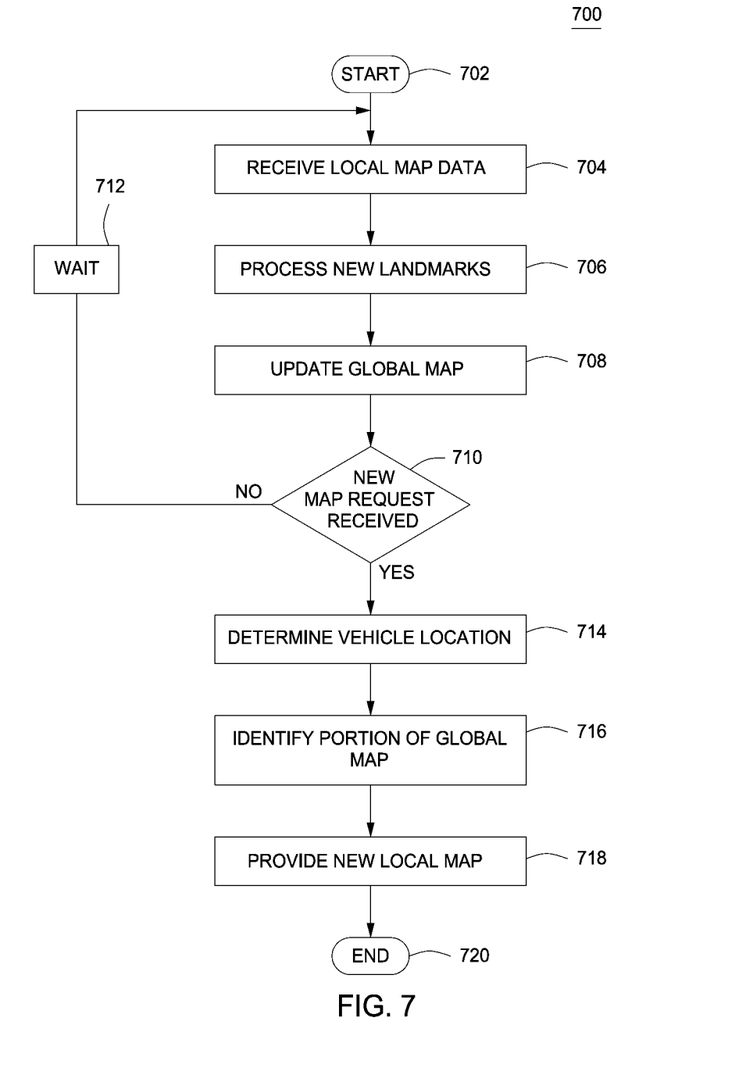
FIG. 7 is a flow diagram of a method of operation for a global map module according to one or more embodiments.

FIG. 7 is a flow diagram of a method 700 of operation of the global map module according to one or more embodiments. In some embodiments, the global map module (e.g., the global map module 328 of FIG. 3) performs each and every step of the method 700. In other embodiments, some steps are omitted or skipped. The method 700 starts at step 702 and proceeds to step 704.

At step 704, the method 700 receives local map data from one vehicle in a plurality of autonomous industrial vehicles. The local map data comprises at least one landmark that previously was not recognized as contained within the local map of the sending vehicle. At step 706 the method processes the new landmarks. In one embodiment the process will combine the landmark data received from multiple industrial vehicles evaluating each new landmark for similarity with the landmarks previously reported. The method adds the existing landmarks new features observed by independent vehicles and reduces the pose and identification uncertainty associated with the landmark. In an alternative embodiment the step implement a process filter which statistically combines observations from multiple industrial vehicles and only generate new landmarks for the global map when sufficient observations have been received to reduce the uncertainty to an acceptable limit. In one embodiment new features are assigned a sundown value which requires that the features be continuously observed to be maintained in the global map.

At step 708, the method 700 updates global map data at the central computer with the feature information. In one embodiment the step will include evaluating the sundown value of map features and removing those landmarks that have not been recently observed. Hence, the global map data includes observed features of another industrial vehicle that facilitate industrial vehicle navigation. Since all the industrial vehicles report to the method 700 in this manner, the global map contains the observed features of all the industrial vehicles.

At step 710, the method 700 determines whether a request (e.g., the request 319 of FIG. 3) for map data is received from a mobile computer of a vehicle. If the request was received, the method 700 proceeds to step 714. If, on the other hand, the request for map data was not received, the method 700 waits until a request arrives and returns to step 704. At step 714, the method 700 determines a current vehicle position for the requesting vehicle. In some embodiments, the method 700 extracts the current vehicle position from the request. In other embodiments, the central computer may know the vehicle position via localization reporting. At step 716, the method 700 identifies a corresponding portion of the global map data. At step 718, the method 700 communicates the corresponding portion of the global map as a local map to the industrial vehicle. In response to the request, the method 700 identifies map data for a sub-area of the global map and communicates the local map data to the mobile computer at the industrial vehicle according to one or more embodiments. The new local map data includes all recently acquired features sent by other vehicles regarding features proximate to the requesting vehicles position. At step 720, the method 700 ends.

In other embodiments, the central computer has knowledge of the positions of all the vehicles. As such, the central computer may automatically extract local map data and send it to the vehicles, i.e., without a request being received. The process may be performed either periodically or when a vehicle enters a region that has previously received a feature information update from another vehicle.

In a further embodiment, local maps may be sent continuously to vehicles as they progress through an environment. The local maps may overlap such that a prior map can be used as the next map is being received. A sequence of local maps may be sent to the vehicle, where the sequence encompasses a path being traversed by a particular vehicle.

Through the use of a global map that is updated using local map data produced by various vehicles, the vehicles can enhance the environment to add navigation landmarks, e.g., position an object to use as a landmark to enhance navigation, then share the feature information with other vehicles via the global map. In other embodiments, obstructions become dynamic feature entries in the local map data such that knowledge of an obstruction is shared by the vehicles through the global map. To enhance the use of features, some embodiments may "sun-down" certain types of features, i.e., a static feature that is repeatedly identified by the vehicles may form a permanent landmark in the global map, while dynamic features that newly appear in the global map may be assigned a sun-down value when they will be removed from the global map unless renewed through being observed another vehicle.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:
1. A method of constructing a local map feature with a vehicle centric measurement, the method comprising:
providing a vehicle pose indicative of a position of an automated guided vehicle with respect to a global coordinate system of global map data, wherein the automated guided vehicle comprises one or more sensors;

providing local map data on a memory associated with the automated guided vehicle, wherein the local map data comprises feature information and landmark data;

capturing, with the one or more sensors, vehicle centric measurement data indicative of one or more objects within the physical environment, the one or more objects comprising an object that changes within the physical environment;

determining, automatically with at least one processor, a dynamic feature pose indicative of a position of the object, an orientation of the object, or both with respect to the global coordinate system by superimposing the vehicle centric measurement data onto the vehicle pose; and updating the feature information of the local map with the dynamic feature pose.

2. The method of claim 1, wherein the automated guided vehicle comprises a transponder, and wherein the vehicle pose is provided via the transponder.

3. The method of claim 1, further comprising:
transforming the vehicle centric measurement data into a vehicle centric feature set; and
determining the vehicle pose based upon the vehicle centric feature set.

4. The method of claim 3, further comprising determining a dynamic feature pose uncertainty indicative of error of the one or more sensors, the vehicle pose, or both.

5. The method of claim 3, further comprising communicating the dynamic feature pose to a central computer remotely located from the automated guided vehicle.

6. The method of claim 3, further comprising:
determining an invisible portion of the feature information, the landmark data, or both based upon the vehicle pose and an observable area of the one or more sensors; and
partitioning the local map data into a partitioned map data, wherein the partitioned map data does not include the invisible portion.

7. The method of claim 6, further comprising:
transforming the vehicle centric measurement data into a vehicle centric feature set; and
determining a next vehicle pose indicative of a new position of the automated guided vehicle with respect to the global coordinate system based upon the vehicle centric feature set and the partitioned map data.

8. The method of claim 6, wherein the one or more sensors comprises a camera.

9. The method of claim 6, wherein the one or more sensors comprises a planar laser scanner coupled to one or more sides of the automated guided vehicle.

10. The method of claim 6, wherein the one or more sensors comprises an encoder attached to a wheel of the automated guided vehicle.

11. The method of claim 6, wherein the automated guided vehicle comprises a forklift.

12. The method of claim 6, wherein the physical environment comprises a warehouse or cold store.

13. The method of claim 1, further comprising
receiving a new feature, a new landmark or both from the global map data, wherein the global map data is stored on a central computer remotely located from the automated guided vehicle; and
updating the feature information of the local map data, the landmark data of the local map data or both according to the new feature from the global map data, the new landmark from the global map data or both.

14. The method of claim 1, wherein the landmark data comprises slot occupancy data indicative of a presence of a pallet, and the method further comprises storing a pallet feature indicative of the pallet in the memory such that the pallet feature is associated with the feature information of the local map data.

15. A method of determining a vehicle position with a vehicle centric measurement, the method comprising:
providing a vehicle pose indicative of a position of an automated guided vehicle with respect to a global coordinate system of a global map data, wherein the automated guided vehicle comprises one or more sensors;
providing local map data on a memory associated with the automated guided vehicle, wherein the local map data comprises landmark data;
providing an observable area indicative of a visible range of the one or more sensors of the automated guided vehicle;
determining an invisible portion of the landmark data based upon the vehicle pose and the observable area of the one or more sensors, wherein the invisible portion is outside the observable area;
partitioning the local map data into partitioned map data, wherein the partitioned map data does not include the invisible portion;
capturing vehicle centric measurement data with the one or more sensors, wherein the vehicle centric measurement data is indicative of an object within the physical environment;
transforming the vehicle centric measurement data into a vehicle centric feature set; and
determining, automatically with at least one processor, a next vehicle pose indicative of the position of the automated guided vehicle with respect to the global coordinate system based upon the vehicle centric feature set and the partitioned map data.

16. The method of claim 15, wherein the automated guided vehicle comprises a transponder, and wherein the vehicle pose is provided via the transponder.

17. The method of claim 15, further comprising:
transforming the vehicle centric measurement data into a feature pose indicative of a position of the object, an orientation of the object, or both with respect to the global coordinate system and a feature pose uncertainty indicative of error of the measurement data;
communicating the feature pose, the feature pose uncertainty, or both to a central computer remotely located from the automated guided vehicle; and
updating the global map data according to the feature pose, the feature pose uncertainty, or both, wherein the global map data is stored on memory associated with the central computer.

18. The method of claim 15, wherein the landmark data comprises slot occupancy data indicative of a presence of a pallet.

19. The method of claim 18, further comprising storing, when the slot occupancy data indicates the presence of the pallet, a pallet feature indicative of the pallet in a memory coupled to the automated guided vehicle such that the pallet feature is associated with the feature information of the local map data.

20. The method of claim 15, wherein the object changes within the physical environment.

21. The method of claim 20, wherein the object is a pallet.

22. The method of claim 20, further comprising:
superimposing the vehicle centric measurement data onto the vehicle pose or the next vehicle pose to create a superimposed result; and determining, based upon the superimposed result, a dynamic feature pose indicative of a position of the object, an orientation of the object, or both with respect to the global coordinate system.

23. A method of updating global map data with a vehicle centric measurement, the method comprising:

navigating a first automated guided vehicle through a physical environment using global map data that defines a global coordinate system;

capturing a first vehicle centric measurement data with a first sensor array coupled to the first automated guided vehicle, wherein the first vehicle centric measurement data is indicative of an object within the physical environment;

transforming the first vehicle centric measurement data into a first feature pose indicative of a position of the object, an orientation of the object, or both with respect to the global coordinate system and a first feature pose uncertainty indicative of error of the first measurement data;

capturing a second vehicle centric measurement data with a second sensor array coupled to a second automated guided vehicle, wherein the second vehicle centric measurement data is indicative of the object within the physical environment;

transforming the second vehicle centric measurement data into a second feature pose indicative of the position of the object, the orientation of the object, or both with respect to the global coordinate system and a second feature pose uncertainty indicative of error of the second measurement data;

transforming, automatically with one or more processors, the first feature pose, the first feature pose uncertainty, the second feature pose, and the second feature pose uncertainty into an estimated feature pose indicative of the position of the object, the orientation of the object, or both with respect to the global coordinate system, wherein the first feature pose, the first feature pose uncertainty, the second feature pose, and the second feature pose uncertainty are transformed into the estimated feature pose according to one or more statistical methods; and updating the global map data according to the estimated feature pose.

24. The method of claim 23, further comprising:

determining a vehicle pose indicative of a position of the first automated guided vehicle with respect to the global coordinate system;

providing local map data on a memory associated with the first automated guided vehicle, wherein the local map data comprises feature information and landmark data;

determining an invisible portion of the feature information, the landmark data, or both based upon the vehicle pose and an observable area of the first sensor array, wherein the invisible portion is outside the observable area;

partitioning the local map data into a partitioned map data, wherein the partitioned map data does not include the invisible portion.

25. The method of claim 23, further comprising:

providing local map data on a memory associated with the first automated guided vehicle, wherein the local map data comprises feature information and landmark data, and wherein the landmark data comprises slot occupancy data indicative of a presence of a pallet;

storing, when the slot occupancy data indicates the presence of the pallet, a pallet feature indicative of the pallet in the memory such that the pallet feature is associated with the feature information of the local map data.

26. The method of claim 23, further comprising:

determining a vehicle pose indicative of a position of the first automated guided vehicle with respect to the global coordinate system, an orientation of the first automated guided vehicle with respect to the global coordinate system, or both, wherein the first vehicle centric measurement data is transformed into the first feature pose by superimposing the first vehicle centric measurement data onto the vehicle pose.

27. The method of claim 23, wherein the object changes within the physical environment.

28. The method of claim 27, further comprising eliminating the estimated feature pose from the global map data after a predefined time period.

* * * * *